E. GESCHKE.
CAGE FOR BALL BEARINGS.
APPLICATION FILED NOV. 20, 1907.
918,996.
Patented Apr. 20, 1909.
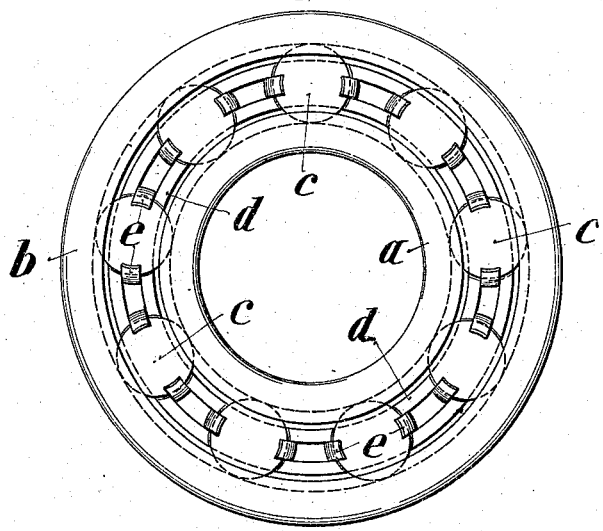
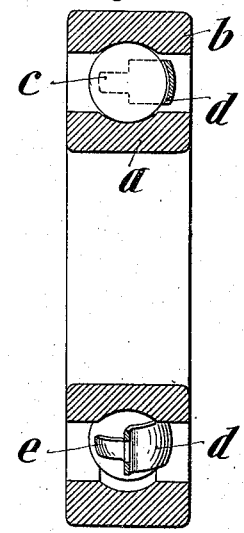
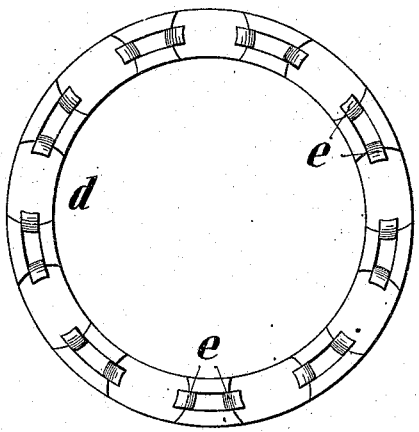
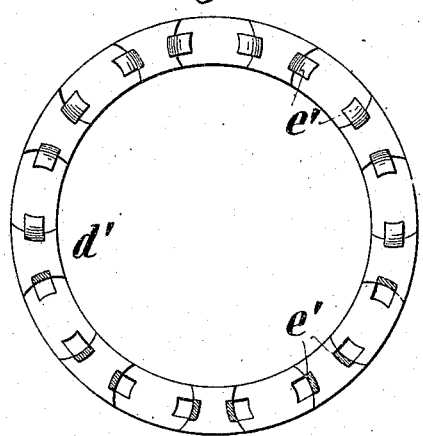
WITNESSES:
Fred White
René Buine
INVENTOR:
Ernst Geschke,
By his Attorneys

UNITED STATES PATENT OFFICE.

ERNST GESCHKE, OF CHARLOTTENBURG-BERLIN, GERMANY.

CAGE FOR BALL-BEARINGS.

No. 918,996.

Specification of Letters Patent.

Patented April 20, 1909.

Application filed November 20, 1907. Serial No. 402,983.

*To all whom it may concern:*

Be it known that I, ERNST GESCHKE, a subject of the German Emperor, residing at No. 5 Charlottenburger - Ufer, Charlottenburg-Berlin, in the Kingdom of Prussia, Germany, have invented certain new and useful Improvements Relating to Cages for Ball-Bearings, of which the following is a full, clear, and exact description.
The invention relates to cages of that class for ball bearings which essentially consist of a partitioned pressed body on which side lugs forming hollows or recesses are arranged and in which after inserting the balls, the bending around of the lugs into their inclosing position holds said balls in place.

Now the present invention relates to an improvement in the construction of cages of this class according to which the above mentioned lugs, which are bent around after inserting the balls for the purpose of maintaining the same in position are formed from the walls of the partition itself by stamping, pressing or in other suitable manner. Thus in this case the lugs are not formed on the partition but out of the body of the cage itself which is utilized for the forming of the lugs at those points where said body can be weakened or perforated without any injury to the solidity of the cage.

In the accompanying drawing two forms of cage constructed according to the present invention are shown in which:

Figure 1 is a side elevation of the race rings of a bearing fitted with a cage constructed according to the present invention, the balls being shown in position, Fig. 2 is a vertical transverse section thereof. Fig. 3 is a side elevation of the cage separately. Fig. 4 is a part sectional plan or development thereof but showing the balls in position. Fig. 5 is a similar view to Fig. 3 illustrating a modification and Fig. 6 is a part sectional plan or development thereof but showing the balls in position.

Referring to Figs. 1 to 4, as far as regards the general construction of the cage, this, according to the present invention consists essentially of the partitioned pressed body $d$ with side lugs $e$ said lugs $e'$ being formed on both sides of hollows or recesses formed in the partitioned body so that each pair of lugs $e$ in the usual manner together with a hollow or recess form the compartments or pockets for the balls.

The method of construction of the bearing illustrated is of no importance for the invention. The one illustrated is a so-called normal bearing and consists of two concentric race rings $a$ and $b$ between which the balls $c$ roll, said balls being held at a uniform distance apart by means of the cage. The lugs $e$ in this example are formed from the body of the cage between the various hollows or recesses holding the balls, and are pressed or stamped out of the middle thereof in the form of two lugs bent in opposite directions. The forming of said lugs is consequently an extremely simple operation. After the body of the cage has been provided with hollows or recesses in a mold specially constructed for that purpose and has been turned on its outer and inner edges to the exact diameter, the lugs $e$ are pressed or stamped out at one operation and bent up into the required position. After the balls have been introduced the lugs are then bent around the balls in the usual manner so that they hold the balls in the pockets thus formed. Even if the lugs are relatively short they nevertheless generally suffice to maintain the balls in the pockets.

In the form of construction shown in Figs. 5 and 6, the lugs $e'$ are not formed from the body $d'$ of the cage between the hollows or recesses, but from the wall of the hollows or recesses themselves, but in other respects the construction of the cage is identical with that hereinbefore shown and described.

In some cases, and this is of great importance, the lugs may have a spring action by using suitable material or by tempering, so that the balls can be pressed in between the lugs, previously bent around into the inclosing position, owing to the elasticity of the lugs they will spring back to their retaining positions after the balls are in place, so that the turning over of the lugs after the insertion of the balls is thus dispensed with.

The lugs can be simultaneously stamped or pressed out and bent over into the inclosing position.

What I claim as my invention, and desire to secure by Patent is:

1. A cage for ball bearings comprising a ring bent to form circular sockets, one for each of the balls, said sockets being adapted to engage the balls on one side, and said ring having lugs cut out of the metal of the ring and bent to engage the balls on the opposite side.

2. A cage for ball bearings comprising a ring bent to form circular sockets, one for each of the balls, said sockets being adapted to engage the balls on one side, and said ring having lugs cut out of the metal of the ring and bent to engage the balls on the opposite side, said lugs being springy, so that the balls may be pressed into place and the lugs will thereafter restore themselves to their retaining positions.

3. A cage for ball bearings comprising a thin metal ring bent to form circular sockets, one for each of the balls, said sockets being adapted to engage the balls on one side, and said ring having lugs adapted to engage the balls on the opposite side, said lugs being made integrally with said ring, and being formed in pairs, each pair being adapted to extend between adjacent balls, and being bent in opposite directions to engage a ball.

4. A cage for ball bearings comprising a ring bent to form circular sockets, one for each of the balls, said sockets being adapted to engage the balls on one side and said ring having its body cut through to form elongated lugs adapted to extend between the balls and engage the latter on the opposite side to said ring.

5. A cage for ball bearings comprising a ring bent to form circular sockets, one for each of the balls, said sockets being adapted to engage the balls on one side and said ring having its body cut through at such circular sockets to form elongated lugs adapted to extend between the balls and engage the latter on the opposite side to said ring.

In witness whereof, I have hereunto signed my name in the presence of two subscribing witnesses.

ERNST GESCHKE.

Witnesses:
 WOLDEMAR HAUPT,
 HENRY HASPER.